US009269945B2

(12) United States Patent
Cho et al.

(10) Patent No.: US 9,269,945 B2
(45) Date of Patent: Feb. 23, 2016

(54) ELECTRODE LEAD AND SECONDARY BATTERY HAVING THE SAME

(71) Applicant: LG Chem, Ltd., Seoul (KR)

(72) Inventors: Seung-Su Cho, Daejeon (KR); Seung-Don Choi, Daejeon (KR); Chang-Moon Jeong, Daejeon (KR); Kyung-Min Lee, Daejeon (KR); Sung-Soo Kim, Daejeon (KR)

(73) Assignee: LG Chem, Ltd. (KR)

( * ) Notice: Subject to any disclaimer, the term of this patent is extended or adjusted under 35 U.S.C. 154(b) by 0 days.

(21) Appl. No.: 14/546,367

(22) Filed: Nov. 18, 2014

(65) Prior Publication Data

US 2015/0072185 A1 Mar. 12, 2015

Related U.S. Application Data

(63) Continuation of application No. PCT/KR2013/009294, filed on Oct. 17, 2013.

(30) Foreign Application Priority Data

Oct. 18, 2012 (KR) .......................... 10-2012-0115941

(51) Int. Cl.
*H01M 2/12* (2006.01)
*H01M 2/34* (2006.01)
(Continued)

(52) U.S. Cl.
CPC .............. *H01M 2/345* (2013.01); *H01M 2/06* (2013.01); *H01M 2/1235* (2013.01); *H01M 2/30* (2013.01); *H01M 10/4235* (2013.01); *H01M 2/12* (2013.01); *H01M 10/5032* (2013.01); *H01M10/5051* (2013.01); *H01M 10/5063* (2013.01); *H01M 2200/20* (2013.01)

(58) Field of Classification Search
CPC ..................... H01M 10/5051; H01M 10/5032; H01M 10/5063
See application file for complete search history.

(56) References Cited

U.S. PATENT DOCUMENTS

2011/0104520 A1  5/2011  Ahn
2011/0300437 A1  12/2011 Yi

FOREIGN PATENT DOCUMENTS

JP  07-201309      8/1995
JP  08-287894 A   11/1996
(Continued)

OTHER PUBLICATIONS

International Search Report from PCT/KR2013/009294 dated Feb. 17, 2014.
Written Opinion of the International Searching Authority from PCT/KR2013/009294, dated Feb. 14, 2014.
Extended Search Report from European Application No. 13847024.0, dated Dec. 22, 2015.

*Primary Examiner* — Jane Rhee
(74) *Attorney, Agent, or Firm* — Lerner, David, Littenberg, Krumholz & Mentlik, LLP

(57) ABSTRACT

An electrode lead for electrically connecting an electrode assembly provided inside a case of a secondary battery with the outside of the case, according to the present invention, comprises: an inner lead which is inserted between sealing parts of the case and to which an electrode tab of the electrode assembly is attached, and which has a gas flow path so as to allow gas to flow between the inside and the outside of the case; and an external lead which is insertably disposed in the gas flow path, is electrically connected with the inner lead when inserted into the gas flow path, seals one end of the gas flow path, and is separated from the gas flow path so as to cut off electrical connection with the inner lead when the pressure of the gas flowing into the gas flow path is greater than or equal to the predetermined pressure.

21 Claims, 22 Drawing Sheets

(51) Int. Cl.
*H01M 2/30* (2006.01)
*H01M 2/06* (2006.01)
*H01M 10/42* (2006.01)
*H01M 10/6561* (2014.01)
*H01M 10/647* (2014.01)
*H01M 10/6553* (2014.01)

(56) References Cited

FOREIGN PATENT DOCUMENTS

| | | |
|---|---|---|
| JP | 2000-067846 A | 3/2000 |
| KR | 20090060497 A | 6/2009 |
| KR | 2011-0048470 A | 5/2011 |
| KR | 20110132856 A | 12/2011 |
| WO | 2011081334 A2 | 7/2011 |

(a)

(b)

ELECTRODE LEAD AND SECONDARY BATTERY HAVING THE SAME

CROSS-REFERENCE TO RELATED APPLICATION

The present application is a continuation of International Application No. PCT/KR2013/009294 filed Oct. 17, 2013, which claims priority to Korean Patent Application No. 10-2012-0115941 filed in the Republic of Korea on Oct. 18, 2012, the disclosures of which are incorporated herein by reference.

TECHNICAL FIELD

The present disclosure relates to a secondary battery technology, and more particularly, to an electrode lead with enhanced structure to improve safety in the event that the internal pressure of a secondary battery increases, and a secondary battery and a battery pack including the same.

BACKGROUND ART

Generally, as opposed to a disposable primary battery, a secondary battery is rechargeable, and is being widely used in electronic devices such as mobile phones, laptop computers, and camcorders, or electric vehicles, and the like. Particularly, a lithium secondary battery has an operating voltage of about 3.6V, and has three times higher capacity than that of a nickel-cadmium battery or a nickel-metal hydride battery being widely used as a power source of an electronic device and a high energy density per unit weight, and thus, its use is on a dramatic upward trend.

A lithium secondary battery mainly uses a lithium-based oxide and a carbon material as a cathode active material and an anode active material, respectively. A lithium secondary battery includes an electrode assembly in which a cathode plate and an anode plate respectively coated with a cathode active material and an anode active material are disposed with a separator interposed therebetween, and an outer casing or a battery case to hermetically receive the electrode assembly together with an electrolyte solution therein.

Meanwhile, a lithium secondary battery may be classified into a can-type secondary battery in which an electrode assembly is embedded in a metal can and a pouch-type secondary battery in which an electrode assembly is embedded in a pouch of an aluminum laminate sheet, based on a case shape.

A secondary battery is generally fabricated through a process of pouring a liquid-state electrolyte or an electrolyte solution in a state that an electrode assembly is received in a case, and sealing the case.

FIG. 1 is an exploded perspective view illustrating construction of a pouch-type secondary battery according to a related art, and FIG. 2 is an assembled view illustrating the pouch-type secondary battery of FIG. 1.

As shown in FIGS. 1 and 2, the pouch-type secondary battery generally includes an electrode assembly 20, and a pouch case 30 to receive the electrode assembly 20 therein.

Here, the electrode assembly 20 has a basic structure of a cathode plate and an anode plate with a separator interposed therebetween, and is received in an internal space formed in the pouch case 30. In this instance, the pouch case 30 may be made up of an upper pouch 31 and a lower pouch 32, and sealing parts are provided along the periphery of the upper pouch 31 and the lower pouch 32 and adhered to each other to hermetically seal the internal space in which the electrode assembly 20 is received.

Meanwhile, at least one cathode tab 21 and at least one anode tab 22 may extend from the cathode plate and the anode plate, respectively. Also, the cathode tab 21 and the anode tab 22 are each joined with an electrode lead 10, that is, a cathode lead 11 and an anode lead 12, and parts of the cathode lead 11 and the anode lead 12 are exposed to the outside of the pouch case 30 to provide an electrode terminal to enable an electrical connection with an external element of the secondary battery, namely, another secondary battery or an external device.

One of the important issues raised in a secondary battery is ensuring safety. A mobile device to which a secondary battery is applied, such as a laptop computer or a mobile phone, is increasingly used, and to meet the growing demand for performance and a usage time of a mobile device, an output and a capacity of a secondary battery in use is continuously increasing. In this situation, if safety of a secondary battery is not ensured, the secondary battery may be damaged, which may lead to an accident such as an electric shock or a fire and an explosion, causing human life and property losses. Accordingly, various protection devices have been applied or is being attempted to ensure safety of a secondary battery.

Nevertheless, at present, it is difficult to assure that safety of a secondary battery was guaranteed. Particularly, while a secondary battery is in use, gas may be generated in the secondary battery, and in this case, the internal pressure of the secondary battery increases, causing a swelling phenomenon.

The gas generation may occur by various causes such as overcharging or overdischarging, a short circuit, and the like, and is problematic in that it may lead to damage of a secondary battery and even an explosion or a fire. Particularly, when an explosion or a fire occurs to a secondary battery, a serious result may be produced, for example, users of a device to which the secondary battery is applied may be damaged, as well as the device. In addition, when the case 30 of the secondary battery is damaged, an electrolyte solution within the secondary battery leaks out, and as a consequence, damage such as a short circuit or an electric shock may occur. Further, in the case of a hybrid vehicle or an electric vehicle powered by a battery or a power storage system, due to its very high output and capacity, damage caused by internal gas generation may be more serious.

DISCLOSURE

Technical Problem

The present disclosure is designed to solve the above problem, and therefore, the present disclosure is directed to providing a new-type electrode lead with improved safety constructed to discharge out gas generated within a secondary battery and cut off an electrical connection with the outside, and a secondary battery and a battery pack comprising the same.

These and other objects and aspects of the present disclosure can be understood by the following description, and will become apparent from the embodiments of the present disclosure. Also, it should be understood that these and other objects and aspects of the present disclosure may be achieved by any means in the scope of the disclosure and combinations thereof.

Technical Solution

To achieve the above objects, an electrode lead according to the present disclosure is an electrode lead for electrically connecting an electrode assembly provided inside a case of a secondary battery to an outside of the case, and the electrode lead includes an inner lead interposed between sealing parts of the case, to which an electrode tab of the electrode assembly is attached, and having a gas flow path formed to allow gas to move between inside and outside of the case, and an outer lead constructed to be inserted into the gas flow path and electrically connected to the inner lead when inserted into the gas flow path, the outer lead which seals one end of the gas flow path and is separated from the gas flow path to cut off the electrical connection with the inner lead when pressure of gas flowed into the gas flow path is higher than or equal to a predetermined pressure.

Preferably, the inner lead is formed such that an appearance of a part interposed between the sealing parts is a circular shape or an oval shape.

Also, preferably, the inner lead is provided with a sealing member at a location where the inner lead comes into contact with the sealing part.

Also, preferably, the gas flow path has an electrode assembly side end of a cross sectional area becoming wider in a direction toward the electrode assembly.

Also, preferably, the electrode lead further includes a ring-type packing member between the outer lead and the inner lead.

Also, preferably, the inner lead has at least one gas flow path.

Also, to achieve the above objects, a secondary battery according to the present disclosure includes the above electrode lead.

Also, to achieve the above objects, a battery pack according to the present disclosure includes the above electrode lead.

Advantageous Effects

According to one aspect of the present disclosure, when an internal pressure increases due to gas generated within a secondary battery, the generated gas in the secondary battery may be discharged out of the secondary battery by separation of an inner lead and an outer lead.

Accordingly, not only damage and an explosion or a fire that may occur due to the increased internal pressure of the secondary battery, but also human life and property damage caused thereby may be prevented.

Also, according to another aspect of the present disclosure, when the inner lead and the outer lead are mechanically separated due to the increased internal pressure, an electrical connection of the inside and the outside of the secondary battery is cut off.

Accordingly, in the event that there is a risk of an explosion or a fire caused by the increased internal pressure of the secondary battery, a flow of electric current is interrupted in advance thereby to suppress additional gas generation within the secondary battery and prevent an electric shock or an explosion and a fire, and to interrupt a flow of electric current to an external device connected with the secondary battery, thereby preventing damage of the external device.

Besides, the present disclosure may have a variety of other effects, and these and other effects can be understood by the following description and will become apparent from embodiments of the present disclosure.

DESCRIPTION OF DRAWINGS

The accompanying drawings illustrate a preferred embodiment of the present disclosure and together with the foregoing disclosure, serve to provide further understanding of the technical spirit of the present disclosure, and thus, the present disclosure is not construed as being limited to the drawing.

MODE FOR DISCLOSURE

Hereinafter, preferred embodiments of the present disclosure will be described in detail with reference to the accompanying drawings. Prior to the description, it should be understood that the terms used in the specification and the appended claims should not be construed as limited to general and dictionary meanings, but interpreted based on the meanings and concepts corresponding to technical aspects of the present disclosure on the basis of the principle that the inventor is allowed to define terms appropriately for the best explanation.

Therefore, the description proposed herein is just a preferable example for the purpose of illustrations only, not intended to limit the scope of the disclosure, so it should be understood that other equivalents and modifications could be made thereto without departing from the spirit and scope of the disclosure.

Figure 1:
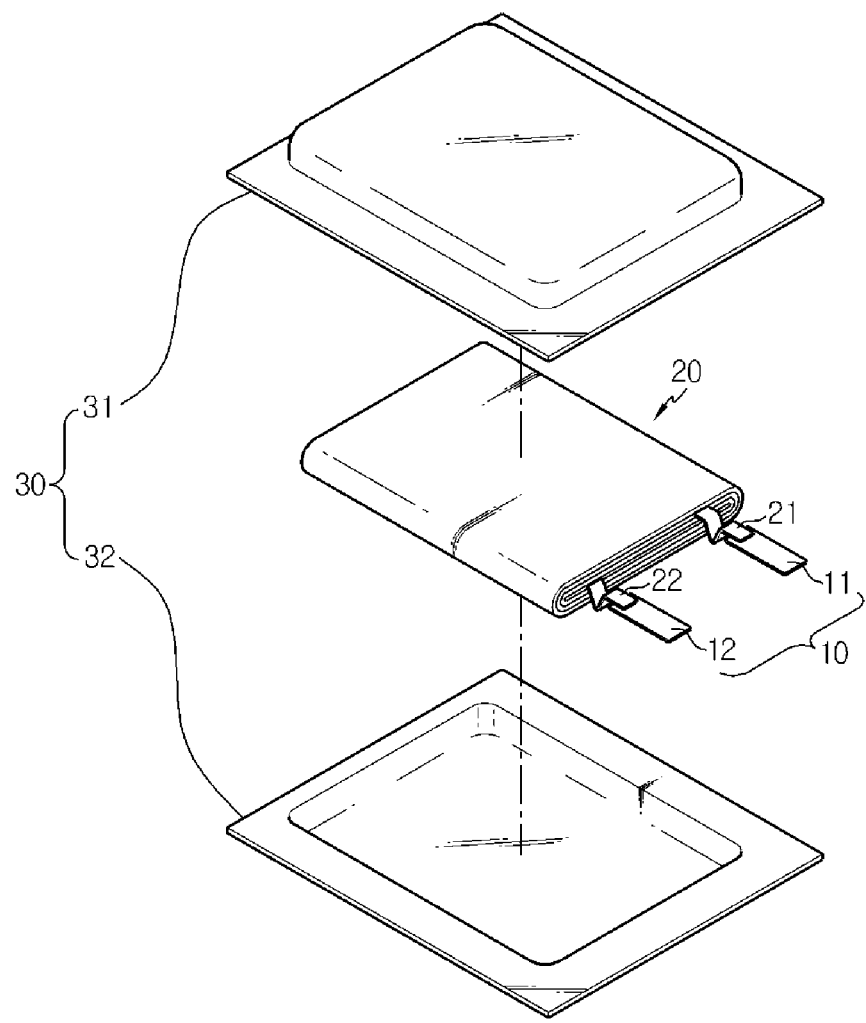
FIG. 1 is an exploded perspective view illustrating construction of a pouch-type secondary battery according to a related art.
Figure 2:
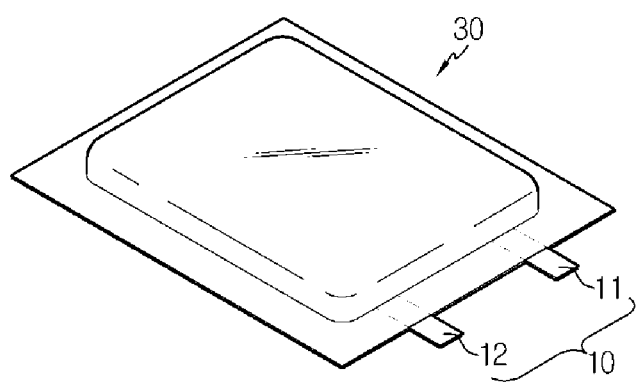
FIG. 2 is an assembly view of the secondary battery of FIG. 1.
Figure 3:
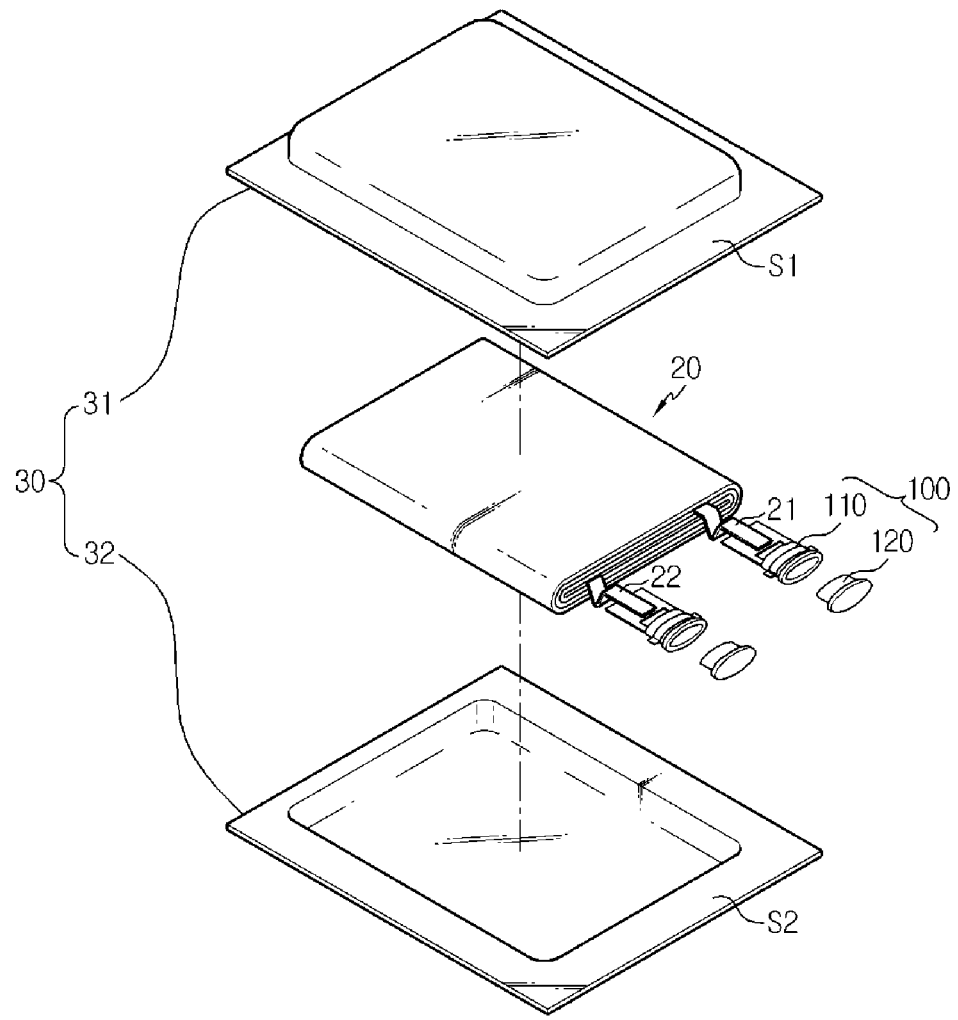
FIG. 3 is an exploded perspective view schematically illustrating construction of a secondary battery according to an exemplary embodiment of the present disclosure.
Figure 4:
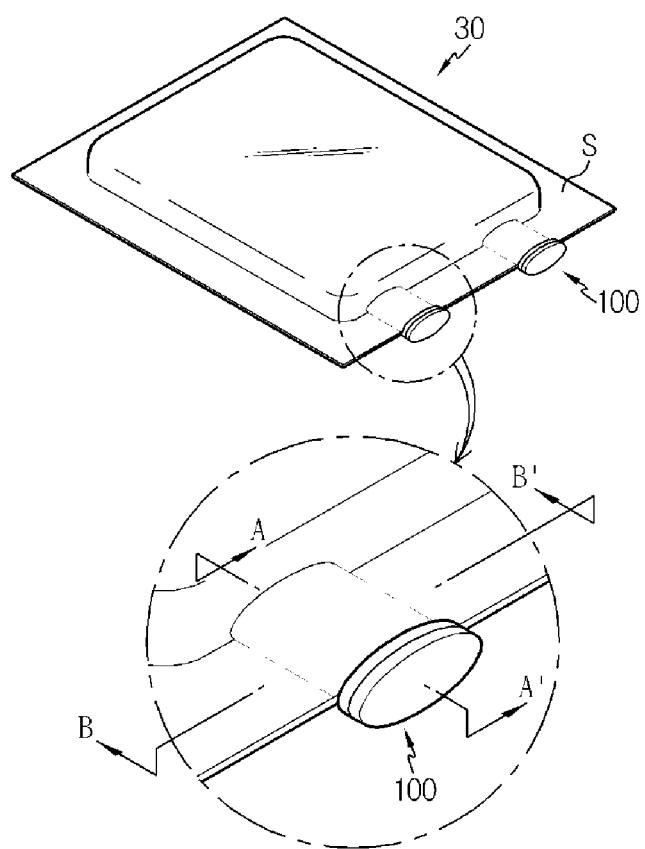
FIG. 4 is an assembly view of the secondary battery of FIG. 3.

FIG. 3 is an exploded perspective view schematically illustrating construction of a secondary battery according to an exemplary embodiment of the present disclosure, and FIG. 4 is an assembly view of the secondary battery of FIG. 3.

Referring to FIGS. 3 and 4, the secondary battery according to the present disclosure includes an electrode assembly 20, a case 30, and an electrode lead 100.

The electrode assembly 20 is constructed in a structure in which at least one cathode plate and at least one anode plate are disposed with a separator interposed therebetween. In this instance, the electrode assembly 20 may be received in the case 30 in a state that a plurality of cathode plates and a plurality of anode plates are stacked, or may be received in the case 30 in a state that one cathode plate and one anode plate are rolled. The electrode plates of the electrode assembly 20 are formed in a structure of a current collector coated with an active material slurry, and generally, the slurry may be prepared by stirring a particulate active material, an auxiliary conductive material, a binder, and a plasticizer with addition of a solvent. Also, for each electrode plate, a part that is not coated with the slurry, namely, a non-coating part may be present, and on the non-coating part, an electrode tab corresponding to each electrode plate may be formed. For each electrode tab, at least one cathode tab 21 and at least one anode tab 22 may be formed on the cathode plate and the anode plate, respectively. The cathode tab 21 or the anode tab 22 may be protrusively formed to be attached to the cathode plate or the anode plate, and each may be made of a same material as a cathode current collector or an anode current collector.

The case 30 has an internal space of a concave shape, and the electrode assembly 20 and an electrolyte solution are received in the internal space.

Particularly, the secondary battery according to the present disclosure is preferably applied to a pouch-type secondary battery, and in this case, the case 30 may be constructed in an aluminum pouch type in which an aluminum thin film is interposed between an insulating layer and an adhesive layer made of polymer.

In this instance, the case 30 may be made up of an upper pouch 31 and a lower pouch 32 as shown in the drawing. Also, a space for receiving the electrode assembly 20 may be formed in either the upper pouch 31 or the lower pouch 32 or both, as shown in FIG. 3. Meanwhile, when the electrode assembly 20 is received in the receiving space of the upper pouch 31 or the lower pouch 32, an adhesive layer of a sealing part S1 of the upper pouch 31 and an adhesive layer of a sealing part S2 of the lower pouch 32 may be adhered by heat welding.

The electrode lead 100 electrically connects the secondary battery to another external secondary battery or device. To do so, the electrode lead 100 is interposed between the sealing parts S of the case 30 of the secondary battery, and an inside end may protrude in a direction toward the electrode assembly 20 within the case 30 and an outside end may protrude out of the case 30.

Figure 5:
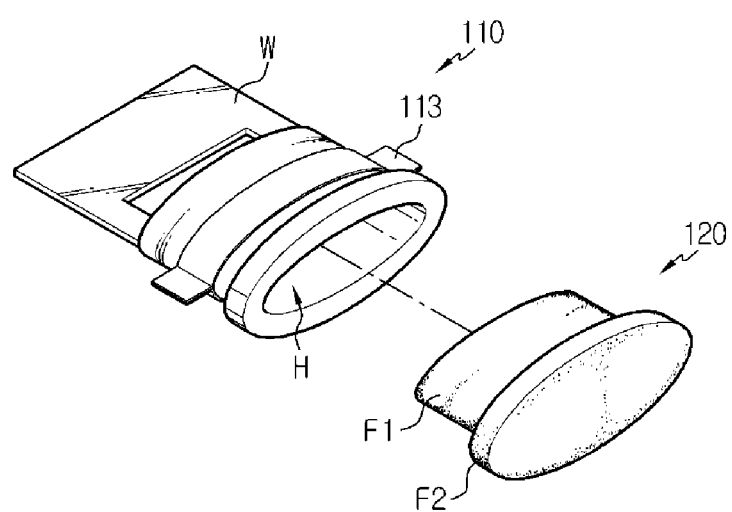
FIG. 5 is a diagram illustrating construction in a state that an inner lead and an outer lead of an electrode lead are separated according to an exemplary embodiment of the present disclosure.
Figure 6:
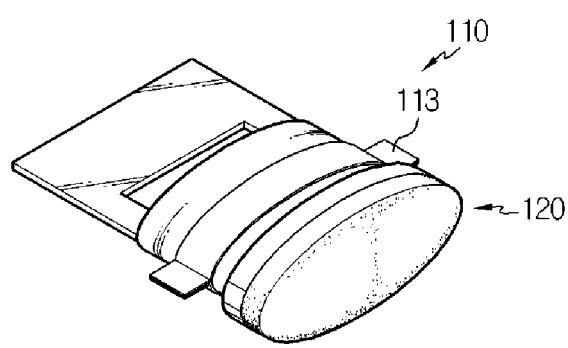
FIG. 6 is a diagram illustrating construction in a state that the inner lead and the outer lead of the electrode lead of FIG. 5 are assembled according to an exemplary embodiment of the present disclosure.

FIG. 5 is a diagram illustrating construction in a state that an inner lead 110 and an outer lead 120 of the electrode lead 100 are separated according to the present disclosure, and FIG. 6 is a diagram illustrating construction in a state that the inner lead 110 and the outer lead 120 of the electrode lead 100 of FIG. 5 are assembled.

Referring to FIGS. 3 through 6, the electrode lead 100 according to the present disclosure includes the inner lead 110 and the outer lead 120.

The inner lead 110 is disposed in an inward direction of the secondary battery, that is, in a direction in which the electrode assembly 20 is present, among the electrode lead 100.

The inner lead 110 may be attached to an electrode tab of the electrode assembly 20 at any one end. That is, the inner lead 110 may be attached to a cathode lead or an anode lead, and when the cathode tab 21 is attached, the inner lead may function as a cathode lead, and when the anode tab 22 is attached, the inner lead may function as an anode lead.

Preferably, the inner lead 110 has, at the inside end, an attachment area to which the electrode tab is attached, as indicated by W in FIG. 5. Also, the electrode tab of the electrode assembly 20 may be attached to the attachment area W of the inner lead 110. In this instance, to enable favorable attachment of the electrode tab, the attachment area W of the inner lead 10 preferably has a flat surface.

At least a part of the inner lead 100 may be interposed between the sealing parts S of the case 30.

Figure 7:
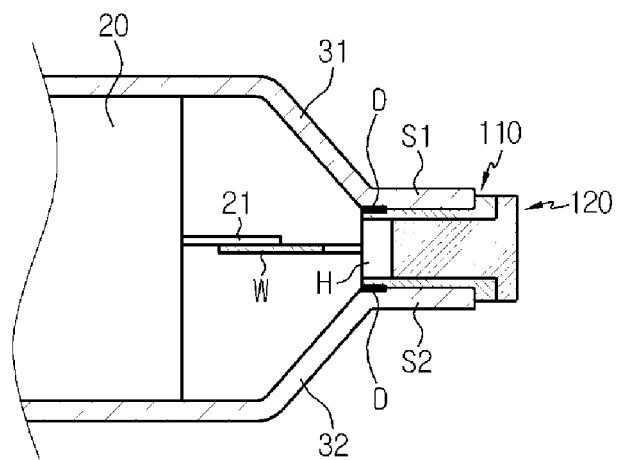
FIG. 7 is a cross-sectional view of FIG. 4 taken along the line of A-A'.

FIG. 7 is a cross-sectional view of FIG. 4 taken along the line of A-A'.

Referring to FIG. 7, the inner lead 10 is interposed between the sealing part S1 of the upper pouch 31 and the sealing part S2 of the lower pouch 32, and preferably, the upper pouch 31 and the inner lead 110, and the lower pouch 32 and the inner lead 110 are closely adhered to maintain hermetical sealing of the case 30.

Preferably, an outer surface of the inside end of the inner lead 110 is closely adhered to an inner surface of the case 30 as indicated by D in FIG. 7. For example, an adhesive layer such as an adhesive tape may be provided between the outer surface of the inside end of the inner lead 110 and the inner surface of the case 30 coming into contact therewith, to adhere the inner lead 110 to the inner surface of the case 30.

According to this embodiment, close adhesion of the inside end of the inner lead 110 and the case 30 is reliably achieved, thereby preventing a gap from being formed therebetween. If close adhesion of the outer surface of the inside end of the inner lead 110 and the inner surface of the case 30 is not made right, a gap is formed between the inside end of the inner lead 110 and the case 30, and some of the gas generated in the secondary battery may flow into the gap. Then, gas generated in the secondary battery fails to flow into a gas flow path well, and consequently, may fail to push out the outer lead 120 inserted into the gas flow path. As a result, even if the internal pressure of the secondary battery increases, the outer lead 120 may not be separated from the gas flow path of the inner lead 110. Besides, when gas generated in the secondary battery flows into the gap between the inside end of the inner lead 110 and the case 30, the gap gradually becomes wider, resulting in damaged sealing between the inner lead 110 and the case 30. However, as in the above embodiment, when the outer surface of the inside end of the inner lead 110 is adhered to the inner surface of the case 30, sealing between the inner lead 110 and the case 30 may be ensured more reliably, to induce gas within the secondary battery to favorably flow into the gas flow path of the inner lead 110.

Meanwhile, as shown in FIG. 5, the inner lead 110 is preferably provided with a sealing member 113 at a location where the inner lead 110 comes into contact with the case 30. Because a material of the inner lead 110 is different from an adhesive layer material of the pouch, adhesion of the inner lead 110 and the case 30 may be poor, and the sealing member 113 enables good adhesion between the inner lead 110 and the case 30. Thus, according to this embodiment, the likelihood that a gap may be formed between the inner lead 110 and the case 30 is prevented, thereby improving hermetical sealing of the case 30 of the secondary battery and effectively preventing gas inside/outside of the secondary battery from flowing out/in or an electrolyte solution from flowing out between the inner lead 110 and the case 30. As the sealing member 113, a sealant may be used, but the present disclosure is not necessarily limited to this type of sealing member 113.

Also, preferably, an appearance of the part of the inner lead 110 interposed between the sealing parts S of the case 30 may be formed in an oval shape. Its description is provided with reference to FIG. 8.

Figure 8:
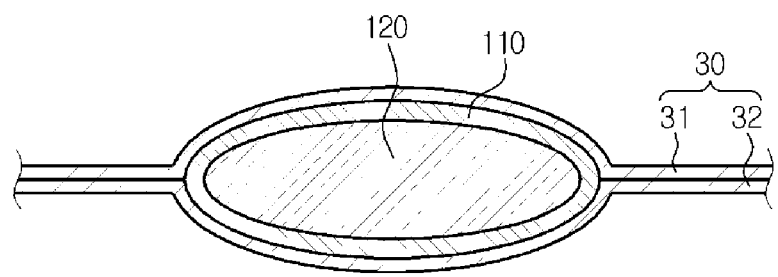
FIG. 8 is a cross-sectional view of FIG. 4 taken along the line of B-B'.

FIG. 8 is a cross-sectional view of FIG. 4 taken along the line of B-B'.

Referring to FIG. 8, the part of the inner lead 110 coming into contact with the sealing part S of the case 30 may have an oval shape. Due to this shape of the inner lead 110, sealing between the inner lead 110 and the case 30 may be achieved more reliably. That is, in case in which the inner lead 110 has an angular shape such as a rectangular shape at the part coming into contact with the sealing part S of the case 30, sealing between the inner lead 110 and the case 30 is not made easy and thus, a gap may be generated between the inner lead 110 and the case 30. However, like the above embodiment, when an appearance of the part of the inner lead 110 coming into contact with the sealing part S of the case 30 is formed in an oval shape, sealing with the case 30 may be further improved.

Figure 9:
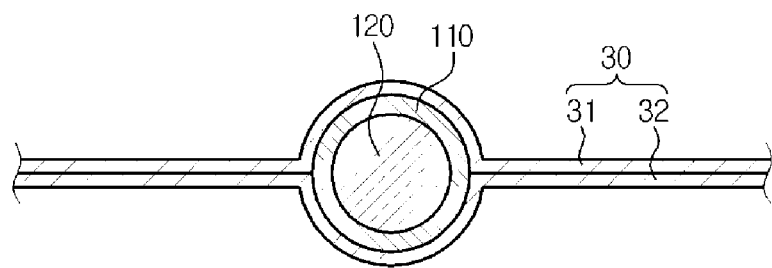
FIGS. 9 and 10 are cross-sectional view illustrating construction of a part where an inner lead comes into contact with a sealing part according to another exemplary embodiment of the present disclosure.
Figure 10:
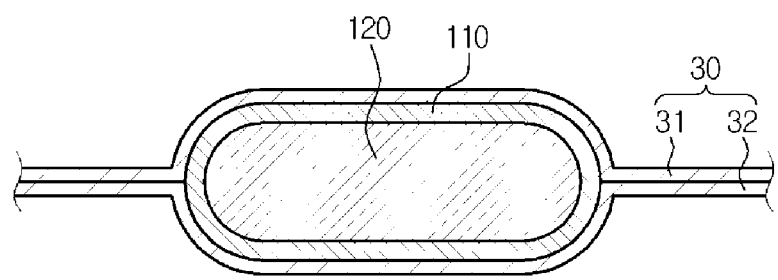

FIGS. 9 and 10 are cross-sectional views schematically illustrating construction of the part of the inner lead 110 coming into contact with the sealing part S according to another exemplary embodiment of the present disclosure.

First, as shown in FIG. 9, an appearance of the part of the inner lead 110 coming into contact with the sealing part S may be constructed in a circular shape. Similar to the case in which the cross section has an oval shape, sealing between the case 30 and the inner lead 110 may be also improved in this embodiment.

Also, as shown in FIG. 10, a portion of the appearance of the part of the inner lead 110 coming into contact with the sealing part S may have a round shape. According to this embodiment, particularly, the inner lead 110 may be rounded at corners and may be flat in the horizontal direction, whereby sealing between the case 30 and the inner lead 110 may be improved.

However, the present disclosure is not necessarily limited by the inner leads 110 having these shapes, and besides, the appearance of the inner lead 110 at the part coming into contact with the sealing part S may be variously constructed.

The inner lead 110 has a gas flow path formed as indicated by H in FIG. 5. The gas flow path H may be formed through the inner lead 110, and in this instance, the penetration direction may be a direction between inside and outside of the case 30 when the inner lead 110 is mounted in the case 30. That is, describing focusing to FIG. 5, because the electrode assembly 20 is disposed at the left side of the inner lead 110, the left side of the inner lead 110 will be an inward direction of the secondary battery and the right side will be an outward direction of the secondary battery, and the gas flow path H may be formed in the horizontal direction in the drawing.

Like this, because the gas flow path H is formed in the inner lead 110, gas may move between inside and outside of the case 30 through the gas flow path H. More preferably, the gas flow path H of the inner lead 110 allows gas present in the case 30 to move out of the case 30. Generally, due to being sealed by a sealing part S, a case 30 is constructed to prevent gas from moving between inside and outside. The case 30 according to the present disclosure also has the sealing part S, but because the gas flow path H is formed in the inner lead 110 interposed between the sealing parts S, gas may move between inside and outside of the case 30. Thus, according to the present disclosure, when gas is generated in the secondary battery due to gasification or decomposition of an active material or an electrolyte solution, gas within the case 30 may be discharged out of the case 30 through the gas flow path H of the inner lead 110.

The outer lead 120 is constructed to be inserted into the gas flow path H of the inner lead 110. Also, in a normal state, the outer lead 120 is inserted into the gas flow path H of the inner lead 110. Accordingly, in this case, gas fails to move between inside and outside of the case 30 through the gas flow path H.

To do so, at least a portion of the outer lead 120 may be constructed in a shape corresponding to the gas flow path H of the inner lead 110. More specifically, referring to FIG. 5, a part indicated by F1 among the outer lead 120 is constructed in a shape corresponding to the gas flow path H, and this part is inserted into the gas flow path H.

When the secondary battery is in a normal state, the outer lead 120 is inserted into the gas flow path H of the inner lead 110, and in this case, the outer lead 120 is electrically connected to the inner lead 110. Accordingly, an electric current generated in the electrode assembly 20 may be provided outside the secondary battery through the inner lead 110 and the outer lead 120. Thus, in this state, the outer lead 120 provides another external element connected to the secondary battery, for example, an external terminal that may be connected to another secondary battery or an external device.

Also, when the outer lead 120 is inserted into the gas flow path H of the inner lead 110, the outer lead 120 hermetically seals one end of the gas flow path H. That is, as shown in FIG. 6, the outer lead 120 is inserted into a right end of the gas flow path H to hermetically seal the right end of the gas flow path H. Also, like this, when the right end of the gas flow path H is hermetically sealed, gas fails to move between inside and outside of the case 30 of the secondary battery through the gas flow path H. Accordingly, in a normal state, the case 30 of the secondary battery becomes sealed. In this instance, to ensure sealing of the case 30, the inner lead 110 and the outer lead 120 are preferably completely closely adhered to each other to prevent the generation of a gap through which gas passes between the gas flow path and the insertion part F1.

Preferably, the outer lead 120 is preferably formed such that an outside part F2 of the part inserted into the gas flow path has a wider cross-sectional area than the part F1 inserted into the gas flow path H. According to this embodiment, when the outer lead 120 is inserted into the gas flow path H of the inner lead 110, sealing between the outer lead 120 and the inner lead 110 may be improved due to the protrusive shape of the outside part F2. Accordingly, when the outer lead 120 is coupled to the gas flow path H of the inner lead 110, gas inside or outside of the secondary battery may be prevented more effectively from leaking out or flowing inwards through the gas flow path H.

Meanwhile, when the pressure of gas flowed into the gas flow path H is higher than or equal to a predetermined pressure, the outer lead 120 may be separated from the gas flow path H.

Figure 11:
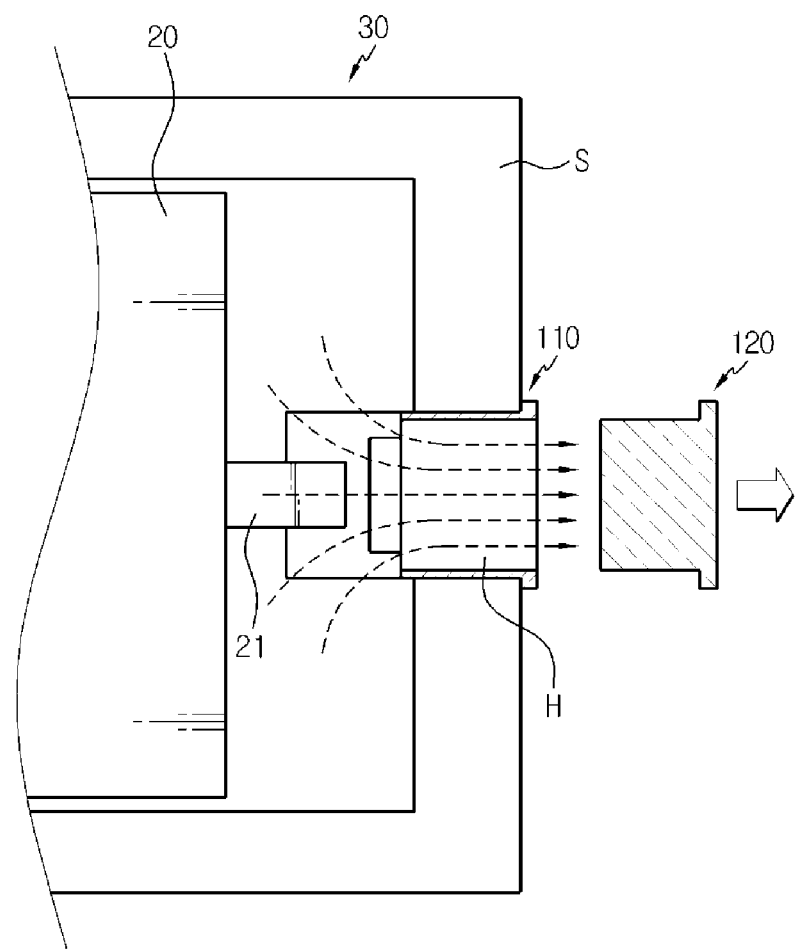
FIG. 11 is a top cross-sectional view schematically illustrating construction in which an outer lead is separated from a gas flow path of an inner lead due to an increased internal pressure, in a secondary battery according to an exemplary embodiment of the present disclosure.

FIG. 11 is a top cross-sectional view schematically illustrating construction in which the outer lead 120 is separated from the gas flow path H of the inner lead 110 due to the increased internal pressure, in the secondary battery according to an exemplary embodiment of the present disclosure. In FIG. 11, for the convenience of description, the cathode tab 21 and the electrode lead 100 connected thereto in the secondary battery are only illustrated.

Referring to FIG. 11, when the secondary battery is in an abnormal state, for example, overcharging, a short circuit, penetration, and the like, gas is generated from the electrode assembly 20 or the electrolyte solution, which may increase the internal pressure of the secondary battery, and in this case, gas may flow into the gas flow path H of the inner lead 110 as indicated by dotted arrows. Also, due to the in-flow of gas, when the pressure of the gas flow path H increases above a predetermined pressure, the outer lead 120 may be separated from the flow gas path H of the inner lead 110 as shown in the drawing. In this instance, the predetermined pressure as a reference at which the outer lead 120 is separated from the gas flow path H may be variously determined based on various consideration factors, for example, specification or a type of the case 30, a type of a device to which the secondary battery is applied, and the like.

Like this, when the outer lead 120 is separated from the gas flow path H of the inner lead 110, as the gas flow path H is released from the sealed state, gas within the case 30 may be discharged out through the gas flow path H. Therefore, according to this aspect of the present disclosure, even if the internal pressure of the secondary battery increases, an explosion or a fire may be prevented.

Besides, when the outer lead 120 is separated from the gas flow path H, the electrical connection of the outer lead 120 and the inner lead 110 is cut off. Accordingly, during discharging, an electric current generated from the electrode assembly 20 cannot be provided outside of the secondary battery, and during charging, an electric current supplied from an external charger cannot enter the secondary battery. Therefore, according to this aspect of the present disclosure, when there is a risk of an explosion or a fire caused by the increased internal pressure of the secondary battery, charging/discharging of the secondary battery is stopped to prevent the secondary battery from staying in an abnormal state and prevent another external element electrically connected to the secondary battery from being damaged and broken.

Meanwhile, when connected to each other, the inner lead 110 and the outer lead 120 provide an electrical connection passage for the secondary battery, and thus, may include an electrically conductive material.

In this instance, the inner lead 110 and/or the outer lead 120 may be made of one electrically conductive material itself. For example, the inner lead 110 and the outer lead 120 shown in FIG. 5 may be entirely made of a metal. Here, the metal constituting the inner lead 110 and the outer lead 120 may include copper, aluminum, nickel, iron, chrome, gold, silver, and alloys thereof.

More preferably, the inner lead 110 and/or the outer lead 120 may be coated with an electrically non-conductive material on the outer surface of the electrically conductive material. For example, in the embodiment of FIG. 5, a body of the inner lead 110 and/or the outer lead 120 is made of an electrically conductive material, and an outer surface of the body may be coated with an electrically non-conductive material.

According to this embodiment, because the conductive material of the inner lead 110 and/or the outer lead 120 is not exposed to the outside, prevention of electric current leaks may be facilitated and corrosion of the conductive material may be prevented.

Also, the inner lead 110 and/or the outer lead 120 is made of an electrically non-conductive material, and an electrically conductive material may be provided on the non-conductive material. This embodiment is described in more detail with reference to FIG. 12.

Figure 12:
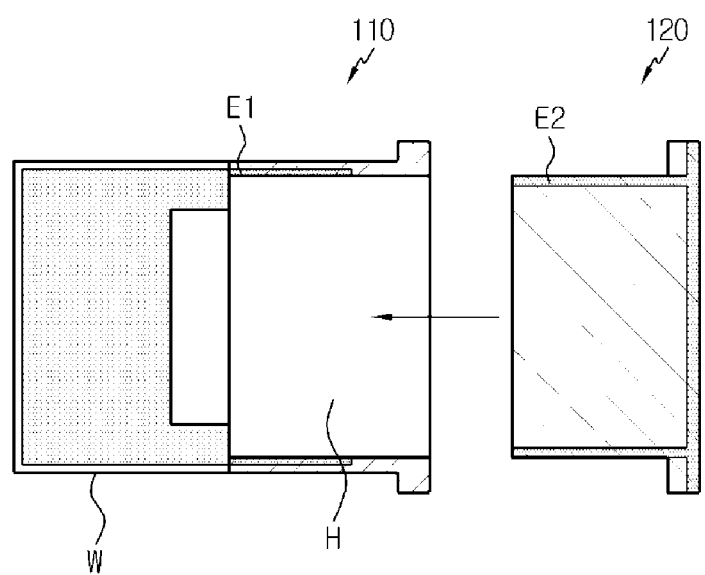
FIG. 12 is a top cross-sectional view schematically illustrating construction of an inner lead and an outer lead according to an exemplary embodiment of the present disclosure.

FIG. 12 is a top cross-sectional view schematically illustrating construction of the inner lead 110 and the outer lead 120 according to an exemplary embodiment of the present disclosure.

Referring to FIG. 12, the bodies of the inner lead 110 and the outer lead 120 may be each made of an electrically non-conductive material. Also, the inner lead 110 and the outer lead 120 may be each provided with an electrically conductive material.

That is, the inner lead 110 may have a pattern E1 made of an electrically conductive material formed from the attachment area W where the electrode tab is attached, to the inner surface of the gas flow path H.

Also, the outer lead 120 may have a pattern E2 made of an electrically conductive material from the outer surface of the part inserted into the gas flow path H to the outside end (the right end of the outer lead 120 in FIG. 12).

In this instance, the electrically conductive material may be provided, in various types such as coating or insertion, to the electrically non-conductive material.

Accordingly, when the outer lead 120 is inserted into the gas flow path H of the inner lead 110, the electrically conductive material pattern E1 provided on the inner surface of the gas flow path H of the inner lead 110 comes into contact with the electrically conductive material pattern E2 provided on the outer surface of the insertion part of the outer lead 120. Thus, when the outer lead 120 is inserted into the gas flow path H of the inner lead 110, an electrical connection may be established from the attachment area W of the inner lead 110 to the outside end of the outer lead 120.

However, although the embodiment of FIG. 12 shows that the inner lead 110 and the outer lead 120 are provided with the electrically conductive material on the electrically non-conductive material, it is obvious that any one of the inner lead 110 and the outer lead 120 may be entirely made of an electrically conductive material, and the other may be entirely made of an electrically non-conductive material and have an electrically conductive material pattern formed thereon.

Meanwhile, the electrode lead 100 according to an exemplary embodiment of the present disclosure may be constructed such that the cathode tab 21 or the anode tab 22 is attached to the inner lead 110 as shown in FIG. 3. That is, the secondary battery may have two electrode leads 100, and the cathode tab 21 of the electrode assembly 20 may be attached to an inner lead 110 of one electrode lead 100 and the anode tab 22 of the electrode assembly 20 may be attached to an inner lead 110 of the other electrode lead 100.

However, a plurality of cathode tabs 21 and a plurality of anode tabs 22 may be provided in the electrode assembly 20, and in this case, the plurality of cathode tabs 21 may be attached to an inner lead 110 of one electrode lead 100, and the plurality of anode tabs 22 may be attached to an inner lead 110 of the other electrode lead 100. Alternatively, the plurality of cathode tabs 21 and the plurality of anode tabs 22 may be each attached to inner leads 110 of a plurality of electrode leads 100.

In contrast, the electrode lead 100 according to another exemplary embodiment of the present disclosure may be constructed such that both the cathode tab 21 and the anode tab 22 are attached to the inner lead 110. Its description is provided with reference to FIGS. 13 and 14.

Figure 13:
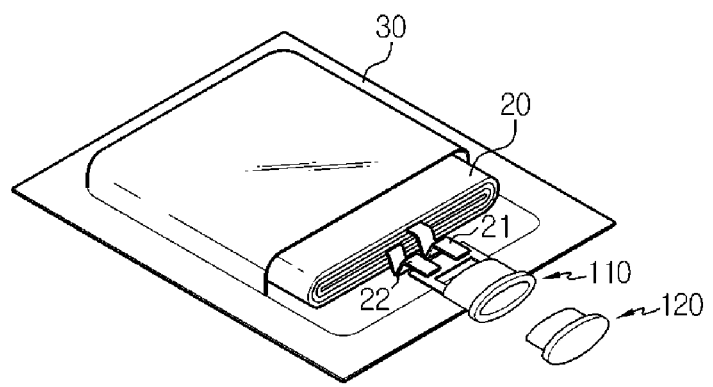
FIG. 13 is a perspective view schematically illustrating construction of a secondary battery according to another exemplary embodiment of the present disclosure.

FIG. 13 is a perspective view schematically illustrating construction of the secondary according to another exemplary embodiment of the present disclosure. In FIG. 13, for the convenience of description, only a portion of the upper pouch is illustrated. Also, FIG. 14 is a top view schematically illustrating a process of forming an electrically conductive material for the inner lead 110 and the outer lead 120 shown in FIG. 13.

Figure 14:
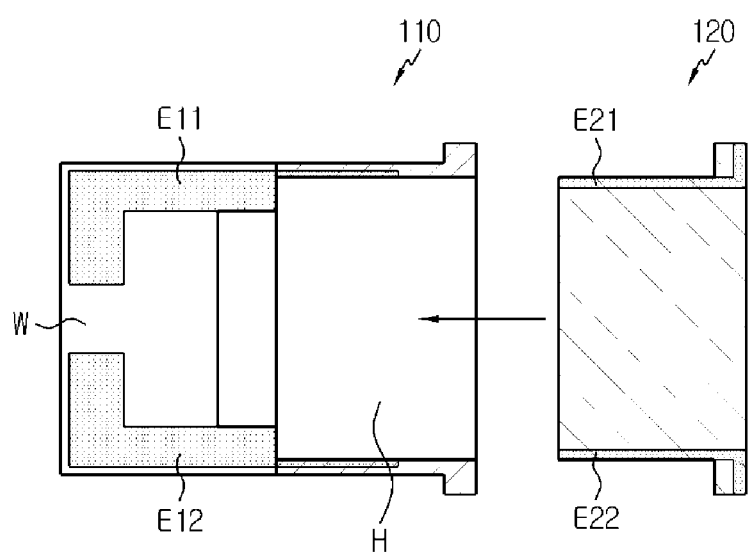
FIG. 14 is a top view schematically illustrating a process of forming an electrically conductive material for an inner lead and an outer lead shown in FIG. 13.

Referring to FIGS. 13 and 14, in the electrode lead 100 according to the present disclosure, both the cathode tab 21 and the anode tab 22 may be attached to one inner lead 110. In this embodiment, to prevent a short circuit of the cathode terminal and the anode terminal, the inner lead 110 and the outer lead 120 may be made of an electrically non-conductive material. Also, a pattern made of an electrically conductive material is formed on each of the inner lead 110 and the outer lead 120, to form two electrically connection passages.

More specifically, the inner lead 110 may have two electrically conductive material patterns E11 and E12 formed from the attachment area W of the electrode tab to the inner surface of the gas flow path H. Also, the outer lead 120 may have two electrically conductive material patterns E21 and E22 formed from the outer surface of the part inserted into the gas flow path H to the outside end.

If the cathode tab 21 of the electrode assembly 20 is attached to the electrically conductive material pattern E11 and the anode tab 22 of the electrode assembly 20 is attached to the electrically conductive material pattern E12, when the outer lead 120 is inserted into the gas flow path H of the inner lead 110, the cathode tab 21 of the electrode assembly 20 may be electrically connected to the outside of the secondary battery through E11 and E21, and the anode tab 22 of the electrode assembly 20 may be electrically connected to the outside of the secondary battery through E12 and E22.

Also, preferably, the gas flow path H formed in the inner lead 110 may have a wider cross-sectional area of the inside end than that of the outside end. This embodiment is described with reference to FIG. 15.

Figure 15:
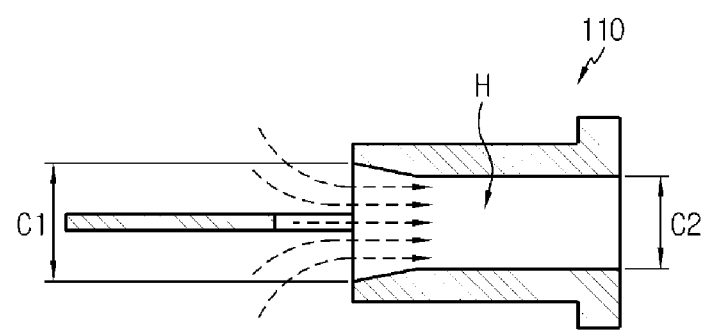
FIG. 15 is a side cross-sectional view schematically illustrating construction of an inner lead of an electrode lead according to another exemplary embodiment of the present disclosure.

FIG. 15 is a side cross-sectional view schematically illustrating construction of the inner lead 110 of the electrode lead 100 according to another exemplary embodiment of the present disclosure.

Referring to FIG. 15, the gas flow path H formed in the inner lead 110 may be constructed such that a cross sectional area of an inside end close to the electrode assembly 20 is wider than a cross sectional area of an outside end distant from the electrode assembly 20. For example, when the gas flow path H shown in FIG. 15 has a circular shape, a diameter C1 of the inside end close to the electrode assembly 20 (left end of the gas flow path H in FIG. 15) may be wider than that of the outside end (right end of the gas flow path H in FIG. 15). According to this embodiment, a larger amount of gas generated in the secondary battery may flow into the gas flow path H of the inner lead 110 as indicated by arrows in FIG. 15. Moreover, according to this embodiment, because the pressure increases as going in an outward direction from the inside end of the gas flow path H, separation of the outer lead 120 from the gas flow path H may be facilitated when the internal pressure of the secondary battery increases.

Figure 16:
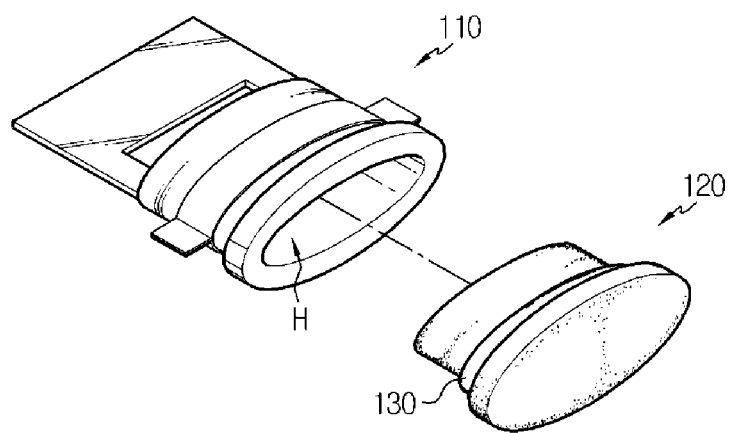
FIG. 16 is a perspective view schematically illustrating construction in a state that an inner lead and an outer lead of an electrode lead are separated according to another exemplary embodiment of the present disclosure.

FIG. 16 is a perspective view schematically illustrating construction in a state that the inner lead 110 and the outer lead 120 of the electrode lead 120 are separated according to another exemplary embodiment of the present disclosure.

Referring to FIG. 16, a ring-type packing member 130 may be further provided between the outer lead 120 and the inner lead 110. When the ring-type packing member 130 is provided on the outer surface of the outer lead 120, and the outer lead 120 is inserted into the gas flow path H, the ring-type packing member 130 may be disposed between the outer lead 120 and the inner lead 110. Thus, according to this embodiment, due to the ring-type packing member 130, sealing between the outer lead 120 and the inner lead 110 may be improved, and movement of gas between inside and outside of the secondary battery through the gas flow path H may be effectively blocked.

Meanwhile, a protrusion or a groove may be formed in the gas flow path H of the inner lead 100 according to the present disclosure. Also, a protrusion or groove corresponding to the protrusion or groove of the gas flow path H may be formed in the external lead 120.

Figure 17:
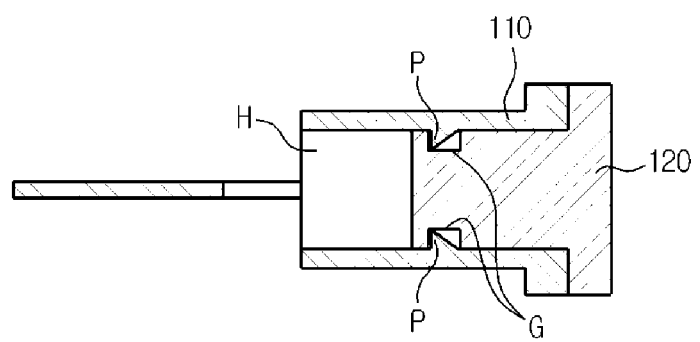
FIG. 17 is a side cross-sectional view schematically illustrating construction of an electrode lead according to another exemplary embodiment of the present disclosure.
Figure 17:
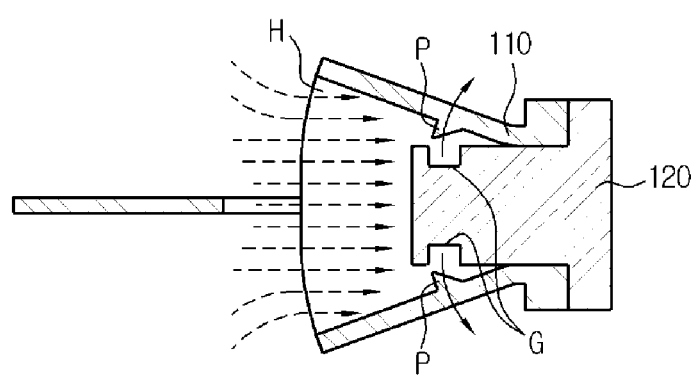

FIG. 17 is a side cross-sectional view schematically illustrating construction of the electrode lead 100 according to another exemplary embodiment of the present disclosure.

First, referring to (a) in FIG. 17, a protrusion P is formed in the gas flow path H of the inner lead 100, and a groove G is formed in the inside end of the outer lead 120. Also, the protrusion P and the groove G are provided at corresponding locations, and when the outer lead 120 is inserted into the gas flow path H, the protrusion P of the gas flow path H may be inserted into and coupled with the grove G of the outer lead 120.

Subsequently, referring to (b) in FIG. 17, when gas is generated in the secondary battery and flows into the gas flow path H of the inner lead 110, the pressure of the gas flow path H increases thereby and may expand wide. Then, as indicated by arrows, the protrusion P of the inner lead may be separated from the groove G of the outer lead 12. Also, the outer lead 120 may be separated in a rightward direction from the gas flow path H due to the increase internal pressure.

According to this embodiment, due to the protrusion P and/or the groove formed in the gas flow path H and the outer lead 120, the outer lead 120 may be stably coupled to the gas flow path H of the inner lead 110 until the pressure flowed into the gas flow path H reaches a predetermined pressure or higher.

However, although the embodiment of FIG. 17 shows that the protrusion P is formed in the gas flow path H and the groove G is formed in the outer lead 120, this is just an example, and the present disclosure may contemplate constructions in which a groove G or a protrusion P is formed in both the gas flow path H and the outer lead 120, or a groove G is formed in the gas flow path H and a protrusion P is formed in the outer lead 120.

Meanwhile, although these embodiments show that one gas flow path H is formed in one inner lead 110, construction of at least two gas flow paths formed in one inner lead 110 is possible.

Figure 18:
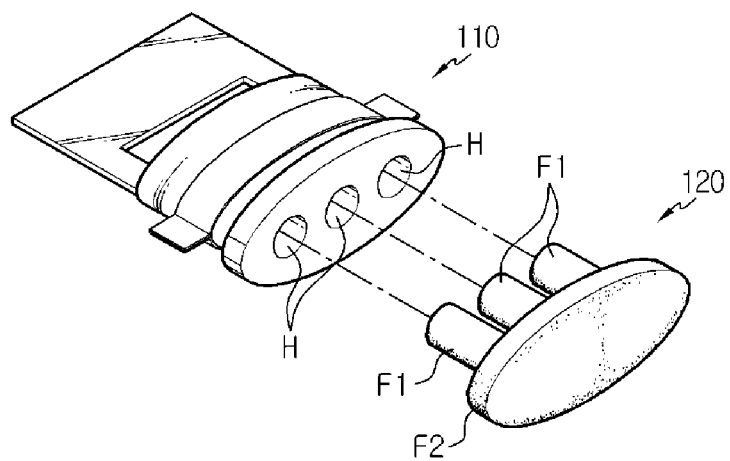
FIG. 18 is a perspective view schematically illustrating construction of an electrode lead according to another exemplary embodiment of the present disclosure.

FIG. 18 is a perspective view schematically illustrating construction of the electrode lead 100 according to another exemplary embodiment of the present disclosure.

Referring to FIG. 18, a plurality of gas flow paths H is formed in one inner lead 110. Also, corresponding to the gas flow paths H, a plurality of parts F1 inserted into the gas flow paths H are formed in the outer lead 120.

Also, although the drawings of the above embodiments show that the appearance of the gas flow path H and the outer lead 120 inserted thereto is a circular shape or an oval shape, the present disclosure is not limited to this shape.

Figure 19:
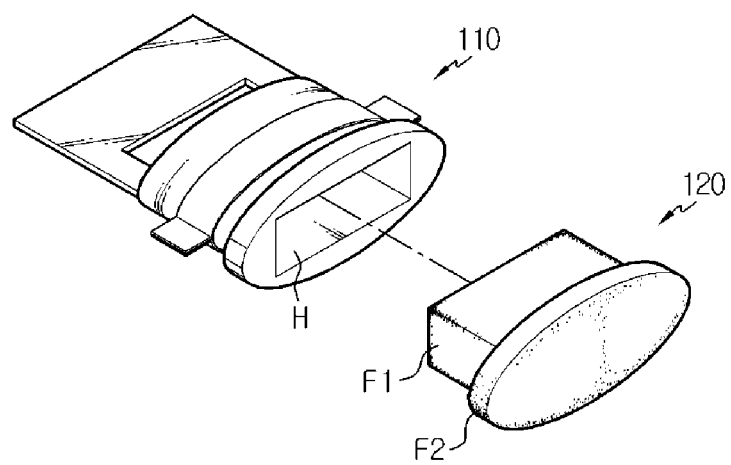
FIG. 19 is a perspective view schematically illustrating construction of an electrode lead according to another exemplary embodiment of the present disclosure.

FIG. 19 is a perspective view schematically illustrating construction of the electrode lead 100 according to another exemplary embodiment of the present disclosure.

Referring to FIG. 19, the gas flow path H of the inner lead 110 may be formed to have a rectangular shape in cross section. Also, in keeping with the shape of the gas flow path H, the part of the outer lead 120 inserted into the gas flow path H may be also constructed to have a rectangular shape in cross section.

Besides, the gas flow path H formed in the inner lead may have various shapes.

Meanwhile, in addition to the drawings of the above embodiments, the inner lead 110 or the outer lead 120 may be constructed in various shapes.

Figure 20:
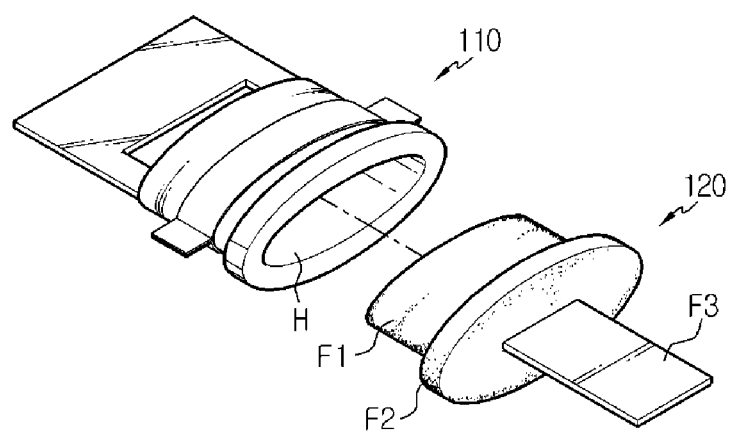
FIG. 20 is a perspective view schematically illustrating construction of an electrode lead according to another exemplary embodiment of the present disclosure.

FIG. 20 is a perspective view schematically illustrating construction of the electrode lead 100 according to another exemplary embodiment of the present disclosure.

As shown in FIG. 20, the outer lead 120 may have a protrusive terminal F3 with a flat surface in a horizontal direction. Also, the protrusive terminal F3 may be connected to an external terminal of another external element. For example, a protrusive terminal of an outer lead provided in another secondary battery may be attached to the protrusive terminal F3 of the outer lead 120, so an electrical connection between the secondary batteries may be established. According to this embodiment, by the protrusive terminal F3 having the flat surface in the horizontal direction, a connection with another external element may be easily established.

Like this, the protrusive terminal F3 is for electrically connecting the secondary battery to another external element and thus may be made of an electrically conductive material.

The secondary battery according to the present disclosure may include the above electrode lead 100.

In this case, the above electrode lead 100 may be applied to both a cathode lead or an anode lead of a secondary battery. That is, the secondary battery according to the present disclosure includes two electrode leads 100 described above, one electrode lead 100 may be connected to the cathode tab 21 and function as a cathode lead, and the other electrode lead 100 may be connected to the anode tab 22 and function as an anode lead.

In this case, the two electrode leads 100, that is, the cathode lead and the anode lead, may be disposed in the same direction in the case 30 of the secondary battery. That is, referring to FIGS. 3 and 4, when the sealing part S of the case 30 of the secondary battery has four corners, two electrode leads 100 may be disposed at the same corner in the sealing part S of the case 30 of the secondary battery. However, the present disclosure is not limited to this embodiment.

Figure 21:
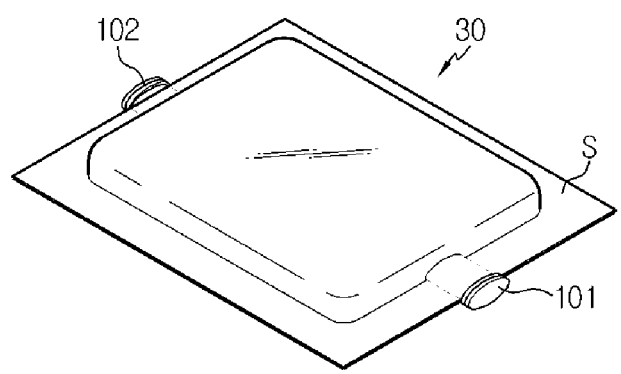
FIGS. 21 and 22 are perspective views schematically illustrating construction of a secondary battery according to another exemplary embodiment of the present disclosure.
Figure 22:
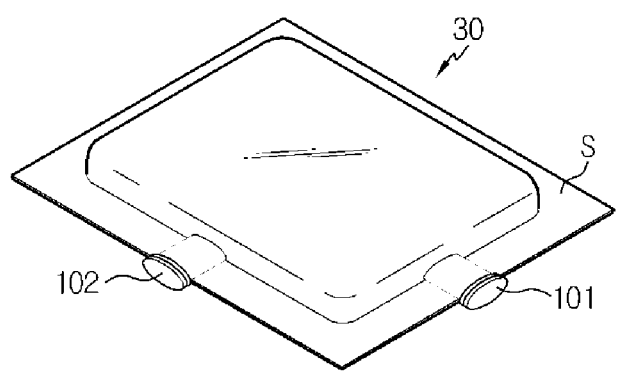

FIGS. 21 and 22 are perspective views schematically illustrating construction of the secondary battery according to another exemplary embodiment of the present disclosure.

First, as one embodiment, two electrode leads 100 may be disposed, as shown in FIG. 21, in the opposing directions in the sealing part S of the case 30 of the secondary battery. That is, the cathode lead 101 and the anode lead 102 may be provided at the corners located in the opposing directions among the four corners of the sealing part S of the case 30.

Also, as another embodiment, two electrode leads 100 may be disposed, as shown in FIG. 22, in mutually perpendicular directions in the sealing part S of the case 30 of the secondary battery. That is, the cathode lead 101 and the anode lead 102 may be each disposed at the adjacent corners among the four corners of the sealing part S of the case 30.

Further, the secondary battery according to the present disclosure includes one electrode lead 100 described above, as shown in FIG. 13, and the electrode lead 100 may function as both a cathode lead and an anode lead.

In addition, the above electrode lead 100 may be applied to only any one of a cathode lead and an anode lead of a secondary battery.

The battery pack according to the present disclosure may include the above electrode lead 100. The battery pack may include one or more secondary battery, and in addition to the secondary battery, may include many protection devices for controlling the charge/discharge of the secondary battery, such as a battery management system (BMS).

The battery pack according to an exemplary embodiment of the present disclosure may include at least one secondary battery in which the above electrode lead 100 is used in a cathode lead and/or an anode lead.

The battery pack according to another exemplary embodiment of the present disclosure may include a plurality of battery modules, and each battery module may include a plurality of cells. In this instance, the above electrode lead 100 may be used to connect the battery modules.

Hereinabove, the present disclosure has been described in detail. However, it should be understood that the detailed description and specific examples, while indicating preferred embodiments of the disclosure, are given by way of illustration only, since various changes and modifications within the spirit and scope of the disclosure will become apparent to those skilled in the art from this detailed description.

What is claimed is:

1. An electrode lead for electrically connecting an electrode assembly provided inside a case of a secondary battery to an outside of the case, the electrode lead comprising:
    an inner lead interposed between sealing parts of the case, to which an electrode tab of the electrode assembly is attached, and having a gas flow path formed to allow gas to move between inside and outside of the case; and
    an outer lead constructed to be inserted into the gas flow path and electrically connected to the inner lead when inserted into the gas flow path, the outer lead which seals one end of the gas flow path and is separated from the gas flow path to cut off the electrical connection with the inner lead when pressure of gas flowed into the gas flow path is higher than or equal to a predetermined pressure.

2. The electrode lead according to claim 1, wherein the inner lead is formed such that an appearance of a part interposed between the sealing parts is a circular shape or an oval shape.

3. The electrode lead according to claim 1, wherein the inner lead is provided with a sealing member at a location where the inner lead comes into contact with the sealing part.

4. The electrode lead according to claim 1, wherein at least one of the inner lead and the outer lead is made of an electrically conductive material.

5. The electrode lead according to claim 4, wherein the electrically conductive material is at least one of copper, aluminum, nickel, iron, chrome, gold, and silver, or alloys thereof.

6. The electrode lead according to claim 4, wherein at least one of the inner lead and the outer lead is coated with an electrically non-conductive material on the electrically conductive material.

7. The electrode lead according to claim 1, wherein at least one of the inner lead and the outer lead comprises an electrically conductive material on an electrically non-conductive material to establish an electrical connection from one end to the other end.

8. The electrode lead according to claim 1, wherein either a cathode tab or an anode tab of the electrode assembly is attached to the inner lead.

9. The electrode lead according to claim 1, wherein both a cathode tab and an anode tab of the electrode assembly are attached to the inner lead.

10. The electrode lead according to claim 1, wherein the inner lead has an attachment area formed for attachment of the electrode tab.

11. The electrode lead according to claim 10, wherein the inner lead is welded to the electrode tab at the attachment area.

12. The electrode lead according to claim 1, wherein the gas flow path has an electrode assembly side end of a cross sectional area becoming wider in a direction toward the electrode assembly.

13. The electrode lead according to claim 1, wherein an outer surface of an inside end of the inner lead is adhered to an inner surface of the case.

14. The electrode lead according to claim 1, wherein the outer lead is formed such that an outside of a part inserted into the gas flow path is wider than the part inserted into the gas flow path.

15. The electrode lead according to claim 1, further comprising:
   a ring-type packing member between the outer lead and the inner lead.

16. The electrode lead according to claim 1, wherein the inner lead has at least one gas flow path.

17. The electrode lead according to claim 1, wherein a protrusion or a groove is formed in the gas flow path of the inner lead and the outer lead, and the protrusion is coupled with the groove.

18. A secondary battery comprising the electrode lead according to claim 1.

19. The secondary battery according to claim 18, wherein the electrode lead is at least one of a cathode lead and an anode lead.

20. The secondary battery according to claim 18, wherein the case has a shape of a pouch.

21. A battery pack comprising the electrode lead according to claim 1.

* * * * *